Aug. 5, 1930.  G. L. HOXIE  1,772,005
LOAD CARRYING TROLLEY
Filed Oct. 1, 1928  2 Sheets-Sheet 1
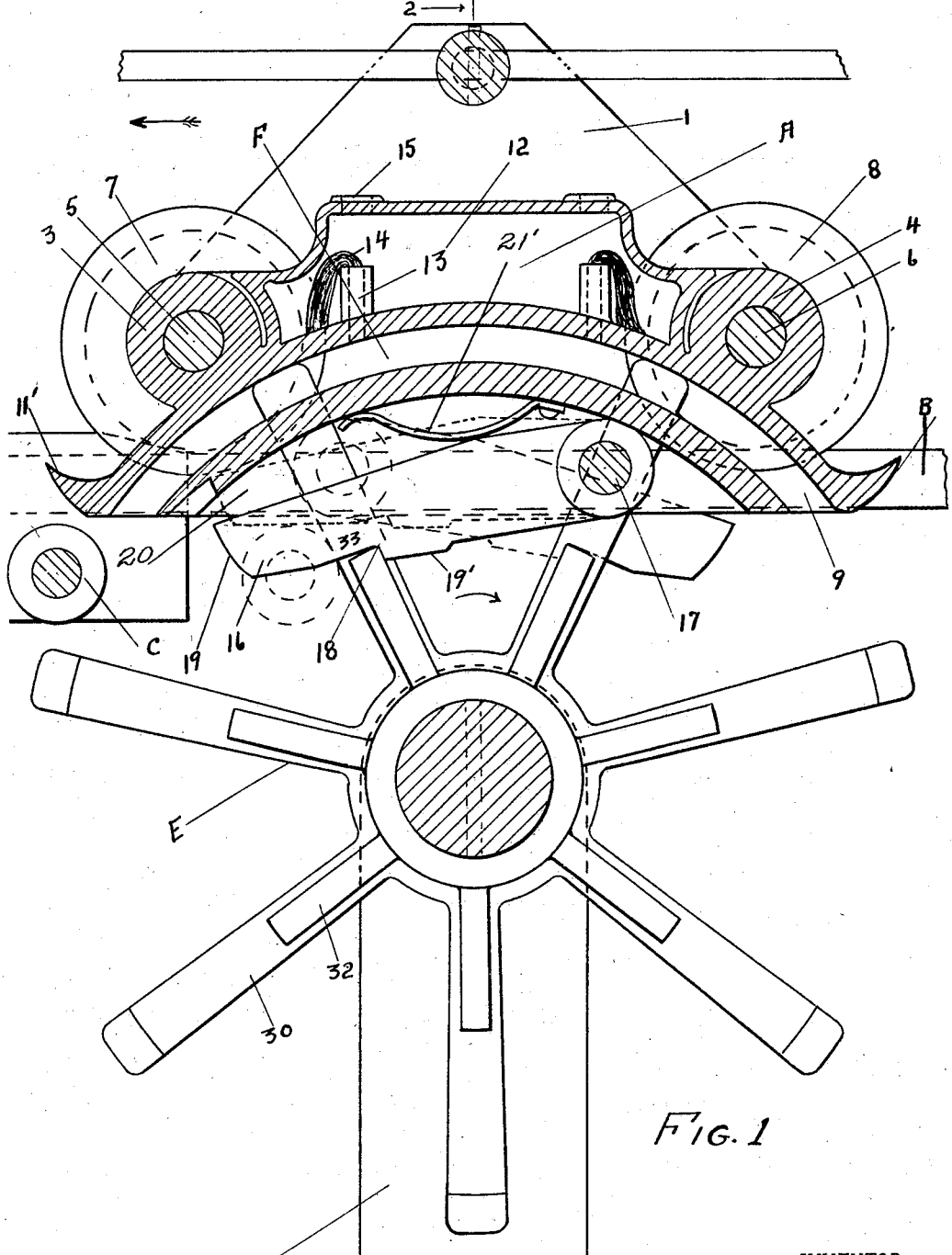
Fig. 1
INVENTOR.
GEORGE L. HOXIE.
BY
ATTORNEYS.

Aug. 5, 1930.  G. L. HOXIE  1,772,005
LOAD CARRYING TROLLEY
Filed Oct. 1, 1928  2 Sheets-Sheet 2
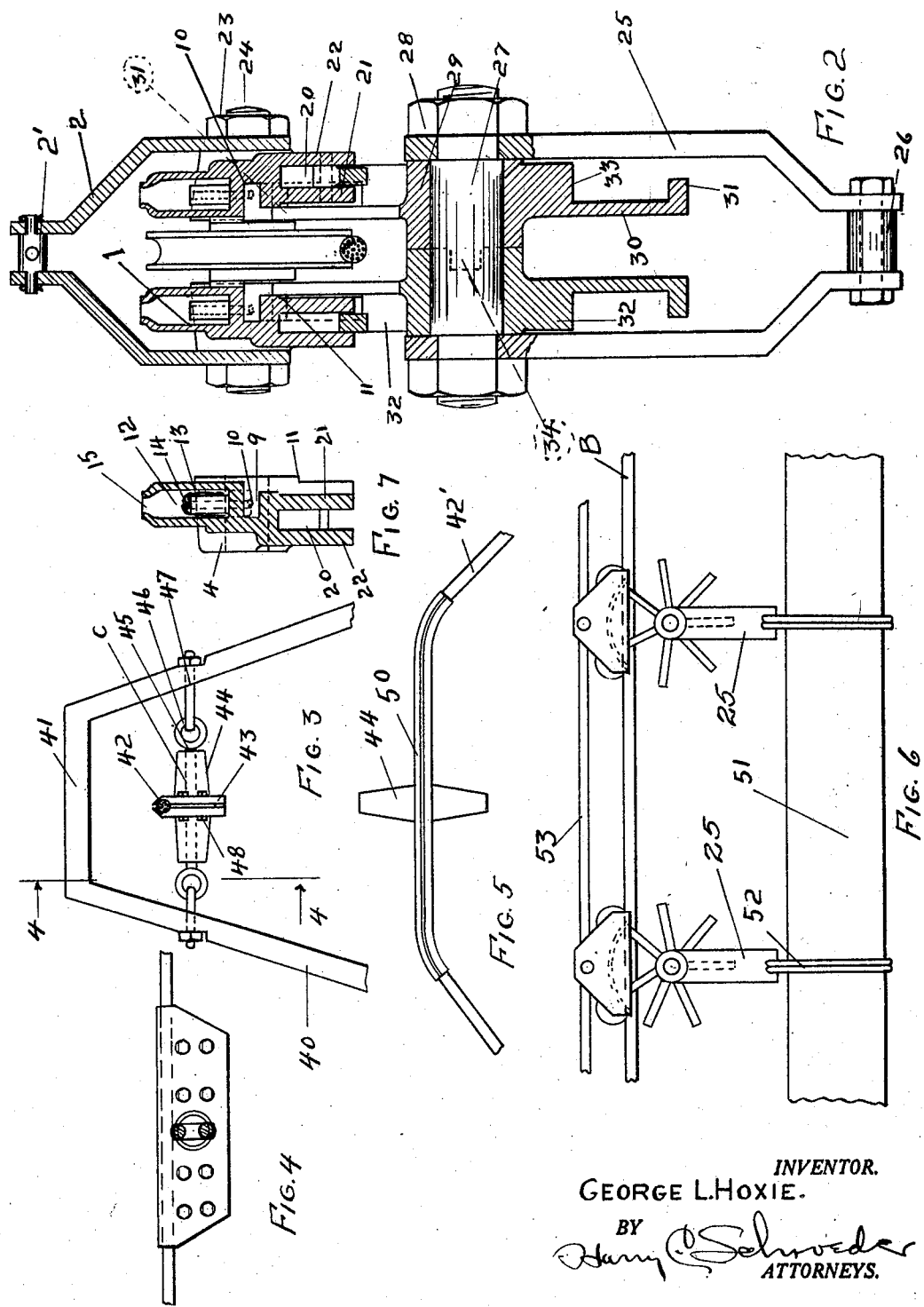
INVENTOR.
GEORGE L. HOXIE.
BY
ATTORNEYS.

Patented Aug. 5, 1930

1,772,005

UNITED STATES PATENT OFFICE

GEORGE L. HOXIE, OF OAKLAND, CALIFORNIA, ASSIGNOR TO F. B. FERNHOFF, TRUSTEE, OF OAKLAND, CALIFORNIA

LOAD-CARRYING TROLLEY

Application filed October 1, 1928. Serial No. 309,577.

My invention is the art of load-carrying trolleys and comprises a stepping support for the load in order to pass the supports for the track, this being usually a cable. It is usual in trolleys in which the load is hung from a carriage running on a cable or track, to have the track supported by curved brackets and the load also carried by oppositely curved brackets so that the carriage and load may pass the support for the track.

An object of my invention is to allow the track, such as a cable, or a rigid track, to be supported from underneath and to have a carriage running on the track with what might be termed a stepping hanger for the load. This hanger, on contacting with a supporting bar, may be described as stepping around the bar and supporting the load from the carriage in this operation. In this manner, a trolley may operate with a load suspended below the track or cable and pass any number of supports for the track or cable.

In the specific embodiment of my invention, I make use of the ordinary trolley cable support, or in some cases modify these slightly to suit my carrier. I have shown a carriage having a pair of aligned wheels forming a truck, and a load carrier having a rotary spider with extended arms similar to the spokes of a wheel, without a rim. The truck has a segmental groove on the same curve as described by outstanding lugs on the spokes of the spider. The engagement of these spokes in the segmental groove is the means to support the load carrier from the carriage.

I have a pair of these spiders with their spokes and angular lugs supporting the load at each side of the carriage, and hanging down on opposite sides of the track and thereby giving a balance support to the load. When these arms strike a supporting bar for the track, they become unlocked from a latch and are free to rotate, and as the carriage passes by the support, the spoke which engages the cross supporting bar is rotated out of engagement with the groove in the carriage and other arms are rotated into engagement therewith, and thereby give the load continuous support. The dogs which hold the spokes are arranged to engage the support bars slightly in advance of the spokes, and thereby free them before they contact with such bar.

My invention comprises in its broader features a mechanical method of transporting goods by a suspended trolley consisting in passing the goods underneath the cross bars supporting the rail, and at the same time holding the load suspended from the trolley carriage.

My invention will be more clearly understood from the following description and drawings, in which:

Figure 1 is a side view partly in section of a trolley carriage, a load carrier and the rotating spider suspending the carrier from the carriage;

Figure 2 is a vertical section of Figure 1 on the line 2—2 in the direction of the arrows, showing on a smaller scale the trolley carriage, the suspending spokes holding the load carrier in the action of passing a cross support for the track;

Figure 3 is a cross section of an A frame showing the cross support for a cable track and the clamp for the cable;

Figure 4 is a side view of Figure 3 on the line 4—4 in the direction of the arrow, with one of the lugs of the frame removed;

Figure 5 is a plan of a curve showing the cable support having a slight tangent and a cross bar somewhat similar to that shown in Figures 3 and 4;

Figure 6 is a side view showing the construction and operation of a plurality of trolleys supporting a log, or other elongated load. This figure also shows the use of a tow rope; and Figure 7 is a cross section of one of the side frames on A section similar to Figure 2.

My assembly comprises a trolley carriage A running on wheels which are supported on a cable track B, this latter being supported by a cross brace C. The load carrier D has a spider E formed of a plurality of spokes having legs which engage in a groove F in the carriage. In this manner, the carrier is supported from the carriage and may pass the supporting brace C on account of the spokes rotating when they strike this cross support.

The mechanical method of transporting a load consists broadly in moving a carriage having a suspended load carrier on a track, which latter is supported by cross braces and passing the carriage over the cross braces, and the carrier underneath, always being suspended from the carriage. Various other steps in this kind of a process will be apparent from the detailed description of the mechanism employed.

The trolley carriage A is constructed as follows, reference being directed particularly to Figures 1 and 2:

Heavy side frames of substantially similar form and construction are oppositely disposed, and one transposed relative to the other, and preferably joined by a yoke 2 and clamp 2′, which may be used to engage a tow rope. The frames have hubs 3 and 4 at each end, carrying axles 5 and 6, on which rotate the trolley wheels 7 and 8. If desired, these wheels may be keyed on the axles and the axles rotate in suitable bearings in the hubs. The frames each have a segmental groove 9 extending inwardly as shown at 10, and have a downwardly extending recess 11, thru which pass the spokes of the spider as hereinafter described. The opposite ends of each frame are upturned at 11′ to slide up on the supports if canted to one side.

An oil chamber 12 is constructed over the grooves 9 and has elevated outlets 13 with wicks 14 to oil the grooves, the oil chambers being filled thru openings 15 which may be closed by plugs.

Each side of the frame carries a pivoted dog 16 which is swivelly mounted on a pin 17. These dogs have notches 18 and an inclined pointed end 19 and a riding surface 19′ for a purpose hereafter described. It is preferable to have these dogs mounted in a recess 20 formed between the inner body 21 and an outer flange 22 of the frames 1. A leaf spring 21′ is disposed in the recess 20 above each dog 16 for pressing the dog 16 downwardly, one end of the spring being fixedly secured to the roof of the recess 20, while the other end thereof is slidable on the said roof so as to allow the flattening of the spring when pressed upwardly by the movement of the dog 16 over the crossing in the manner to be hereinafter set forth. In the construction shown, the wheel axles 5 and 6 are used to hold the two side frames in the proper adjustment by means of the nuts 23 screwed on the threaded ends 24 of the axles. Any other equivalent manner of forming a solid frame would be suitable. No particular clamp for the tow cable is shown as these are well known in the art.

The load carrier D is constructed as follows, having reference particularly to Figures 1 and 2:

Heavy brackets 25, similarly formed and oppositely disposed, are joined at the bottom by a shackle 26 and thereby form a substantial carrier frame. If desired, this can be formed in the shape of a yoke, and have a pin 27 extending from side to side and secured at each end by nuts 28 or other devices to hold the brackets in proper adjustment.

A pair of spiders E having heavy hubs 29 are rotatably mounted on the pin 27. Each of these spiders have spokes 30 with inturned lugs 31. Attached to or integral with the spokes are projecting shoulders 32, in this case extending outwardly from the spokes and having a squared end 33 to engage the dogs 16, the dogs 16 being pressed against the shoulders 32 by the said leaf spring 21′. The spiders are mounted with their arms or spokes parallel and by means of a lock or key 34 turn in unison. If desired, the two spiders may be made as one element instead of as separate elements, but with the construction shown, it is a simple matter to increase the spacing apart of the spiders to accommodate different size trolley tracks and supporting cross bars C.

The manner of assembly and operation of the trolly carriage A and the load carrier D with the spider E is as follows:

The carriage would be assembled as above described, and placed on a track or a cable B. The spokes 30 and the inturned lugs 31 of the spiders E will be inserted into grooves 9 and slots 11 and thereby suspend the load carrier D. As above described, the dogs 16 on each side of the carrier face in opposite directions, and engage the projecting shoulders 32 at their squared ends 33 in the notches 18. By this construction, the spiders E are maintained from turning and hold the load carrier D as rigid and fixed suspension members from the trolley carriage.

Presuming the trolley is moving in the direction of the heavy arrow in Figure 1, the inclined pointed end 19 of the pivoted dog 16 contacts with the cross brace C, and is elevated to the position shown in fine dots. This unlatches the spider from the dogs by disengaging the projecting shoulders 32 and the notches 18. The continued movement of the carriage contacts the cross brace C with the spider arms as shown in dotted line in Figure 1, and forces the spider to rotate in a clockwise direction, as indicated by the arrow. This displaces the spoke near the trailing end of the carriage from the groove 9 and causes a free spoke at the leading end to enter the other end of the segmental groove. As the spoke against which the cross brace C contacts is displaced from engagement with the carriage, another spoke takes its place; and the dog 16 will be forced into immediate engagement with the spoke and held in proper position by the action of the leaf spring 21'. In this traverse of the support C underneath the carriage, the end 33 of the shoulder 32 engages the riding surface and holds the dog 16 elevated until the spoke against which the support contacts passes the pivot pin 17, or if desired, the support C may function to hold the dog 16 elevated.

It will thus be seen that the load carrier is continuously suspended from the trolley carriage, and is passed underneath the cross brace while the carriage moves over the top. This is done without any oscillating movement or raising up and down of the load carriage D. The groove 9 is actually formed on the curvature of the path of the lugs 31. Two arms engaging the carriage at the same time give a satisfactory suspension for the load carrier, but if desired, the machine may be proportioned so that three or more arms will engage the carriage.

The track structure is constructed as follows, having reference particularly to Figures 3, 4 and 5:

In Figure 3 an A frame or truss is shown having similar legs 40, cross bar 41 and the cross brace C holding the track 42. This cross brace and track support comprises a plurality of saddles 43 having formed integral therewith an internally screw threaded lug 44 in which is mounted a screw 45 having an eye 46. This is connected to the legs 40 by a cable or bolt 47. The saddles are tightly clamped together by bolts 48 and are bell mouthed at their ends to prevent chafing.

A turn or corner is illustrated in Figure 5, in which the saddles 50 are curved so as to lead the cable forming the track around an angle. In this construction it is advisable to have the saddles straight, that is, in a tangent at the cross brace, in order that the trolley carriage may be passing in a straight line in moving thru this support.

In the detail shown in Figure 6, two trolley carriages and their load carriers are shown supporting an elongated load 51, which may be a log, by cables, clamps or the like 52 secured to the lower part of the brackets 25. In this case, a tow cable 53 is illustrated, being connected to the trolley carriage and thereby moving the load along the track. The tow cable 53 may also be secured at the pin 26 below the cable B.

It will be obvious that my invention may be materially modified without departing from the spirit thereof to suit special requirements and different sizes or dimensions of trolley carriages and load carriers required. If it is necessary to extend the width of the trolley carriage or load carrier, the spokes of the spider may pass on the outside of the carriage and their engaging lugs extend inwardly.

I claim:

1. A trolley conveyor, comprising in combination a trolley carriage, wheels thereon, a curved groove in the carriage, a load carrier, a suspension device to support the load carrier from the carriage, said suspension device having a spider comprising a series of spokes, lugs on the ends of said spokes, said lugs being adapted to allow a cross support for a track to pass between the carriage and the load carrier, and dogs pivotally mounted in the trolley carriage adapted to hold the spokes in a fixed position and to be disengaged from the spokes on contact with said cross support.

2. A trolley conveyor comprising in combination a trolley carriage having side frames, wheels mounted therebetween, curved grooves in each side frame, pivoted dogs on each side frame having notches and a pointed end, a load carrier having a transverse pin, rotary spiders rotatively mounted on said pin, spokes forming the spider having lugs on the end of each spoke, said lugs engaging and moving in the curved grooves in the said side frames, and having projecting shoulders adapted to engage the notches of the said dogs, said dogs being positioned to contact with a cross brace of a track, disengage the spider spokes and be held in elevated position while the conveyor moves past the cross brace.

3. A trolley conveyor as claimed in claim 2, having a lubricating chamber and means to convey lubricant to the grooves in the side frames.

4. A trolley carriage comprising a carriage frame, a pair of sheaves or wheels pivotally mounted and disposed adjacent the opposite ends of said frame, a pair of star wheels, each comprising a hub, a plurality of arms radiating from said hub, lugs intermediately disposed on said arms adapted to engage a pawl, carrier lugs at the extremities of said arms, said star wheels being pivotally mounted in a hanger frame, inwardly facing arcuate channels formed in said carriage frame, said channels being adapted to cooperate with said carrier lugs, pawls oppositely disposed and pivotally mounted on said carriage frame, and so disposed as to oppositely engage said intermediately disposed lugs on said star wheels, said pawls being so disposed and formed as to release said star wheels by coaction with a track support member, previous to operation of said star wheel by said track support member.

5. The combination with a cable provided with transverse supports, of a trolley adapted for travel along said cable, said trolley comprising a carriage frame, sheave wheels mounted at opposite ends of said frame for travel along said cable, said frame having a pair of inwardly facing arcuate channels formed about a center substantially below said cable and transversely thereto, a pair of star wheels, provided with peripheral lugs on the arms thereof adapted to register with and engage in said arcuate channels in said carriage frame, means for locking said wheels against rotation, said means being released by cooperation with said transverse supports, returning to locking position after said carriage has passed over said transverse support, said star wheels being pivotally mounted in a hanger frame and oppositely disposed relative to said cable, and means cooperating with either said carriage frame or said hanger frame for drawing said carriage along said cable.

In testimony whereof I affix my signature.

GEORGE L. HOXIE.